United States Patent
Negel

(10) Patent No.: US 10,800,322 B2
(45) Date of Patent: Oct. 13, 2020

(54) SIDE FLASHING LAMP WITH LIGHT GUIDE ELEMENT, LENS AND HOUSING

(71) Applicant: SMR Patents S.à.r.l., Luxembourg (LU)

(72) Inventor: Raimund Negel, Unterensingen (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/559,389

(22) PCT Filed: Mar. 18, 2016

(86) PCT No.: PCT/IB2016/051538
§ 371 (c)(1),
(2) Date: Sep. 18, 2017

(87) PCT Pub. No.: WO2016/147154
PCT Pub. Date: Sep. 22, 2016

(65) Prior Publication Data
US 2018/0072232 A1    Mar. 15, 2018

(30) Foreign Application Priority Data
Mar. 19, 2015 (DE) .................. 10 2015 104 163

(51) Int. Cl.
*B60Q 1/26* (2006.01)
*F21S 43/37* (2018.01)
(Continued)

(52) U.S. Cl.
CPC .............. *B60Q 1/2665* (2013.01); *B60R 1/06* (2013.01); *F21S 43/245* (2018.01); *F21S 43/27* (2018.01);
(Continued)

(58) Field of Classification Search
CPC ...... F21S 41/235; F21S 41/236; F21S 41/237; F21S 41/239; F21S 43/241; F21S 43/243;
(Continued)

(56) References Cited

U.S. PATENT DOCUMENTS 7,357,542 B2 * 4/2008 Waldmann ........... B60Q 1/2665
362/487
7,699,511 B2 * 4/2010 Kawaji ................ B60Q 1/2665
362/494

(Continued)

FOREIGN PATENT DOCUMENTS

DE    202005014268 U1    12/2005
DE    102004044035 A1    3/2006
(Continued)

OTHER PUBLICATIONS

International Preliminary Report on Patentability for PCT/IB2016/051538, Chapter II.
(Continued)

*Primary Examiner* — Robert J May
(74) *Attorney, Agent, or Firm* — Jones Day

(57) ABSTRACT

A lighting device for a rear-viewing device of a motor vehicle includes at least one housing device, at least one lens, and at least one light guide device arranged at least in certain areas between the housing device and the lens. Light produced from at least one light source can be coupled into the light guide device, and the light guide device on the one hand and the housing device and/or the lens on the other hand are at least in certain areas connected to one another by means of overmolding, at least in certain areas, the light guide device. A method for producing such a lighting device is also described.

13 Claims, 2 Drawing Sheets

(51) Int. Cl.
  *F21S 43/27*   (2018.01)
  *F21S 43/245*  (2018.01)
  *B60R 1/06*    (2006.01)
  *B29C 45/16*       (2006.01)
  *B29C 45/14*       (2006.01)
  *F21V 8/00*        (2006.01)
  *B29L 11/00*       (2006.01)
  *B60R 1/12*        (2006.01)

(52) U.S. Cl.
  CPC ............... *F21S 43/37* (2018.01); *B29C 45/14* (2013.01); *B29C 45/16* (2013.01); *B29L 2011/0075* (2013.01); *B60R 2001/1253* (2013.01); *G02B 6/001* (2013.01)

(58) Field of Classification Search
  CPC ...... F21S 43/245; F21S 43/247; F21S 43/249; F21S 43/235; F21S 43/237; F21S 43/239; B60Q 1/2665
  See application file for complete search history.

(56) References Cited

U.S. PATENT DOCUMENTS

| | | | | |
|---|---|---|---|---|
| 7,954,985 B2* | 6/2011 | Bisnack | ............... | B60R 1/1207 362/494 |
| 8,477,044 B2* | 7/2013 | Wagner | ............... | B60Q 1/2665 340/815.4 |
| 8,733,991 B2* | 5/2014 | Fukasawa | ............ | B60Q 1/2665 362/494 |
| 9,458,979 B2* | 10/2016 | Song | ..................... | F21S 48/234 |
| 2002/0057575 A1* | 5/2002 | Schwanz | ............... | B60Q 1/2665 362/487 |
| 2006/0210236 A1 | 3/2006 | Waldmann | | |
| 2007/0058383 A1 | 3/2007 | Gunther | | |
| 2008/0112176 A1 | 5/2008 | Liesener | | |
| 2009/0284365 A1* | 11/2009 | Wagner | ............... | B60Q 1/2665 340/465 |
| 2013/0242586 A1 | 9/2013 | Huizen et al. | | |

FOREIGN PATENT DOCUMENTS

| | | |
|---|---|---|
| DE | 102004054732 A1 | 5/2006 |
| DE | 102005013682 A1 | 9/2006 |
| DE | 102009030684 A1 | 12/2010 |
| DE | 102011018511 A1 | 1/2012 |
| DE | 112009002619 T5 | 8/2012 |
| DE | 102011103200 A1 | 12/2012 |
| DE | 102011106595 A1 | 12/2012 |
| DE | 102012211822 A1 | 5/2014 |
| DE | 102012211821 A1 | 6/2014 |
| EP | 1914118 A2 | 4/2008 |
| EP | 2774814 A1 | 9/2014 |
| EP | 2796322 A1 | 10/2014 |
| FR | 2937603 A1 | 4/2010 |
| JP | 2008171747 A | 7/2008 |
| JP | 2010052442 A | 3/2010 |
| JP | 2013222657 A | 10/2013 |

OTHER PUBLICATIONS

International Search Report dated Jun. 16, 2016, in corresponding International Application No. PCT/IB2016/051538.
International Preliminary Examination Report dated Jun. 11, 2017, in corresponding International Application No. PCT/IB2016/051538.
International Written Opinion dated Mar. 2, 2017, in corresponding International Application No. PCT/IB2016/051538.
Reply to International Search Opinion dated Jan. 12, 2017, in corresponding International Application No. PCT/IB2016/051538.
Reply to International Written Opinion dated Jun. 1, 2017, in corresponding International Application No. PCT/IB2016/051538.
German Written Opinion dated Feb. 12, 2015 in corresponding German Application No. DE 10 2015 104 163.4.
German Search Report in corresponding German Application No. DE 10 2015 104 163.4.
Reply to German Written Opinion dated Mar. 8, 2015 in corresponding German Application No. DE 10 2015 104 163.4.

* cited by examiner

SIDE FLASHING LAMP WITH LIGHT GUIDE ELEMENT, LENS AND HOUSING

CROSS-REFERENCE TO RELATED APPLICATIONS

This application is a national stage entry of International Patent Application No. PCT/IB2016/051538, filed Mar. 18, 2016, which claims the benefit of German Patent Application No. DE 10 2015 104 163.4, filed Mar. 19, 2015, the disclosures of each of which is incorporated herein by reference in their entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to a lighting device for a rear-viewing device of a motor vehicle. For example, the lighting device may include at least one housing device, at least one lens, and at least one light guide device arranged at least in some areas between the housing device and the lens, where light produced by at least one light source can be coupled into the light guide device. The following description also includes a method for producing a lighting device.

Lighting devices are known which can be used in rear-viewing devices, in particular rear-view mirrors, such as exterior rear-view mirrors, of a motor vehicle.

2. Description of Related Art

A generic lighting device is known, for example, from DE 10 2005 013 682 A1. This published application relates to an exterior rear-view mirror of motor vehicles. It is proposed that the exterior rear-view mirror includes a mirror head and a housing, which in turn includes a recess for a repeating flashing light. In this recess, a lens and a light guide, into which light can be coupled by means of at least one lighting means, are provided. It is proposed that the lens is secured on the housing by adhesive bonding or welding. It is further proposed that the light guide and the lens are integrally formed as one piece with one another. This exterior rear-view mirror is in principle a proven technique. It has been shown, however, that depending on the requirement of the shape of the recess in the housing, in particular its geometry, a maximum homogeneity of the light emission over the entire surface of the lens or the light guide cannot always be achieved.

A further generic lighting device is known from DE 20 2005 014 267 U1, which discloses a vehicle light with a light guide with central light coupling. In order to provide a vehicle light which includes as few components as possible and can be economically produced, it is proposed that a light guide includes a plurality of light guide sections arranged adjacent to one another in the longitudinal direction, and the light from at least one light source is coupled in between two longitudinally adjacent light guide sections in opposite directions. It is further proposed that the light guides are arranged in a region between a housing of a rear-view mirror and a lens. In order to allow for the securing of the light guide, it is proposed that retaining means are applied to the light guide by means of an injection moulding method. A disadvantage of this vehicle light, however, is the fact that, due to the number of individual components involved, its assembly and installation in the rear-view mirror device is elaborate and therefore cost-intensive. First, the light guide is to be connected to the housing of the rear-viewing device, and then the light plate is to be arranged. During the assembly, there is also the possibility of a relative displacement occurring of the individual components in relation to one another, which can exert a negative influence on the light characteristics of the vehicle light.

Finally, US 2010/0238015 A1 discloses a typical lighting device which can be used in an exterior mirror of a motor vehicle. It is proposed that light guides are arranged on a housing device, and that, after installation in the rear-view mirror, this housing device is covered by a lens. This lighting device, too, exhibits the disadvantage that assembly and installation in the rear-view mirror is complicated and expensive because a considerable number of components must be individually installed. Thus, in this situation, the precise positioning of the individual components relative to one another must be maintained.

SUMMARY

In an aspect, one object of the following description is to provide a lighting device which overcomes the disadvantages known from the prior art, allows in particular the greatest possible homogeneity of a light emission, and at the same time exhibits a constructive simple structure, and can also be easily and therefore cheaply installed in a rear-viewing device of a motor vehicle.

In an example, this object is solved according to the invention in that the light guide device on the one hand, and the housing device and/or the lens on the other hand, are at least in some areas connected to one another by means of overmolding at least in some areas of the light guide.

In this situation, it can in particular be envisaged that the rear-viewing device includes at least one rear-view element, preferably including at least one mirror device and/or at least one imaging device, such as a camera, and/or at least one actuator device, in particular for moving the rear-viewing device.

It is also proposed that the housing device may be included at least in some areas by the rear-viewing device, in particular a housing device which at least in some areas surrounds the rear-view element, and/or is connected to the rear-viewing device, which is arranged in particular on a side of the housing device which faces away from the rear-view element, preferably being accommodated at least partially in a recess.

A lighting device can also be characterized in that the light guide device includes at least one light guide, and/or that light which propagates along a longitudinal direction of the light guide device can at least in some areas be radiated in a direction perpendicular to the longitudinal direction, in particular in a direction of the lens.

It is also proposed that the lens is at least partially transparent for the light emitted from the light source and/or from the light guide device, and/or that the housing device is at least in some areas non-transparent for the light emitted from the light source and/or from the light guide device.

An advantageous embodiment is further characterized in that the light source includes at least one light diode, at least one gas discharge lamp, and/or at least one incandescent lamp.

It is further proposed that the housing device and/or the lens is or are formed by means of overmolding at least some areas of the light guide.

It can also be envisaged that the housing device and/or the lens at least in some areas directly surrounds the light guide device, preferably in such a way that the light guide device is connected form-fitting with the housing device and/or to the lens, and/or that the area of the light guide device which faces towards the lens is at least in some areas left out from being surrounded by the housing device.

With the aforementioned embodiments it is preferred that the lens in some areas directly surrounds the light guide device over its entire circumference completely, where the lens is preferably arranged in some areas at a distance from the housing device.

In another example, it can be envisaged that the light guide device is arranged at least in some areas at a distance from the lens, and in some areas is directly surrounded by the housing device.

Finally, it is proposed that the lighting device includes at least one reflection device, arranged at least in some areas between the light guide device and the housing device, for example on a surface of the housing device facing towards the light guide device, where preferably by means of the reflection device, the light emitted from the light source and/or from the light guide device can be reflected at least partially or completely.

A method for producing a lighting device and/or for arrangement in and/or at a rear-viewing device of a motor vehicle includes the provision of at least one light guide device, and the formation of at least one housing device and/or a lens by means of overmolding at least part of the light guide device.

At least some aspects of this invention are based on the surprising finding that, due to the fact that a light guide is provided and that this light guide is then at least partially overmolded (where due to the overmolding, the housing device and/or the light plate are produced and connected to the light guide), a lighting device can be provided which fulfils the highest demands for homogeneity of the light emission, and, at the same time, exhibits a constructive simple structure. In addition, this allows for simple and therefore economical production and installation in a rear-viewing device. Due to the two-step production of the light guide and the light plate, a separation of the functions is incurred into light guide and lens, as a result of which it is made possible for the light guide and the lens to exhibit different optical properties, and, in particular, different materials can be used for the light guide and the lens. This therefore allows for the optical properties of the light emission system, including the light guide and the lens, to be varied to a greater extent than it would be possible with an integrally formed configuration of the light guide and the lens. Moreover, the overmolding of the light guide leads to the formation of a single unit from the light guide, lens and/or housing device. Within this unit, the individual components are inseparably connected to one another, in particular by a form-fitting connection of the components with one another, as well as by chemical bonding during the overmolding process. Accordingly, at the same time, the advantages of an integrally formed configuration are attained, in particular allowing a simple installation of the unit in a rear-viewing device, without the fear of de-positioning the individual components of the lighting device relative to one another.

BRIEF DESCRIPTION OF THE SEVERAL VIEWS OF THE DRAWINGS

Further features and advantages of the invention are derived from the following description, in which preferred embodiments of the invention are explained in the framework of schematic drawings. The figures show.

DETAILED DESCRIPTION

Figure 1:
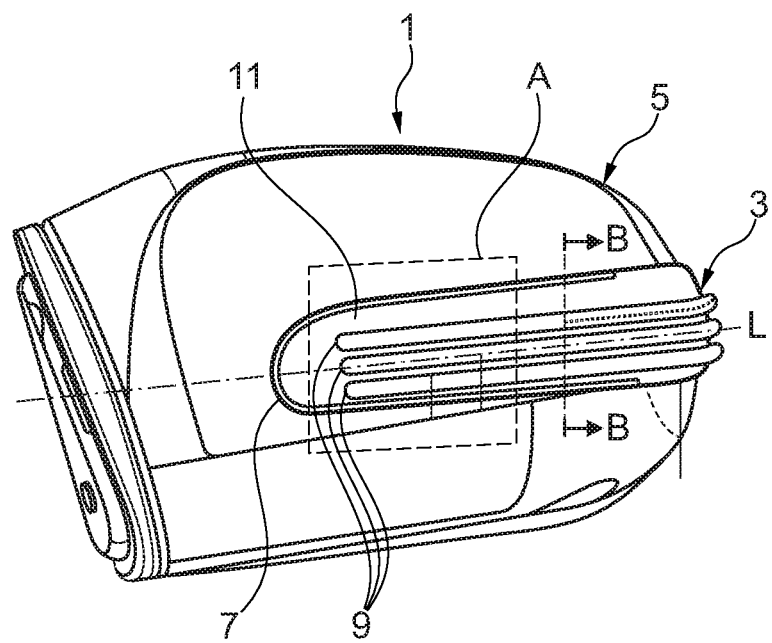
FIG. 1 is a diagram illustrating a schematic view from above onto a rear-viewing device with a lighting device according to a first embodiment.

FIG. 1 shows a schematic view from above onto a rear-viewing device 1, into which a lighting device 3 according to the invention is built. The rear-viewing device includes a housing device 5, having a recess 7, into which the lighting device 3 is inserted and secured. In this example, the lighting device 3 is arranged on a side of the housing device 5 which is located opposite an opening of the rear-viewing device 1, arranged in which is a rear-view element in the form of a mirror glass. The rear-viewing device 1 is adjustably mounted by means of an actuator device (not shown).

Figure 2A:
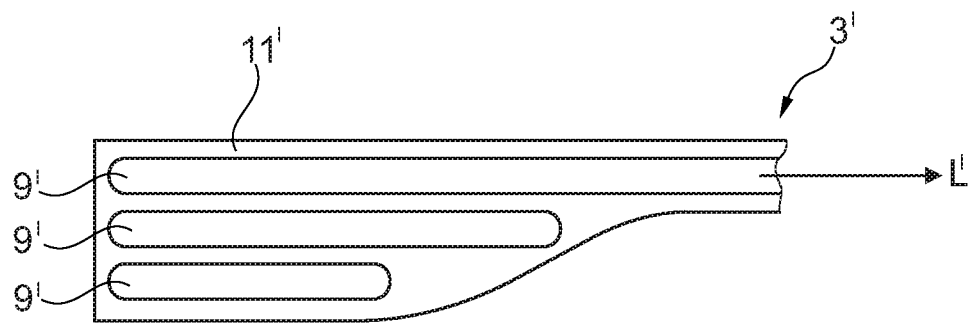
FIG. 2a is a diagram illustrating a detail view according to the section A from FIG. 1 of a second alternative embodiment of a lighting device.

Shown in FIGS. 2a to 2d are alternative embodiments of the lighting device 3 from FIG. 1. Each embodiment is shown according to a section A from FIG. 1. Those elements of the lighting devices 3', 3", 3''', $3^{IV}$, represented in FIGS. 2a to 2d, which correspond to those of the lighting device 3 bear the same reference numbers, but with one or more strokes. The lighting device 3', as shown in FIG. 2a, includes a plurality of light guide devices in the form of light guides 9' with a longitudinal direction L'. The light guides 9' are overmolded in such a way that a lens 11' is formed. By means of a light source (not shown), light can be coupled into the light guides 9', and emerges in a known manner from these along the longitudinal direction L' of the light guides 9', in order then to leave the lighting device 3' through the lens 11'.

Figure 2B:
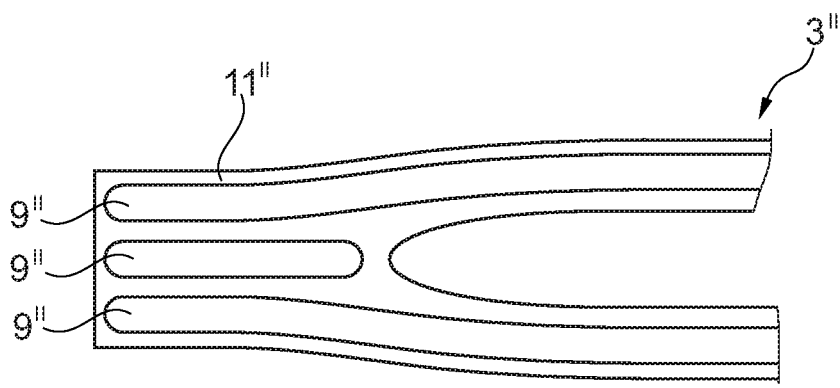
FIG. 2b is a diagram illustrating a detail view according to the section A from FIG. 1 of a third alternative embodiment of a lighting device.
Figure 2C:
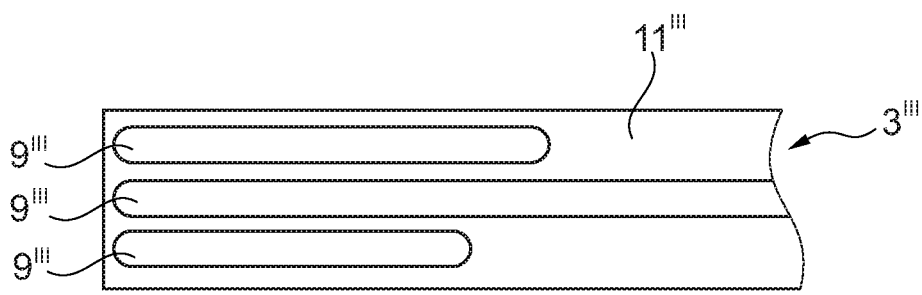
FIG. 2c is a diagram illustrating a detail view according to the section A from FIG. 1 of a third alternative embodiment of a lighting device.
Figure 2D:
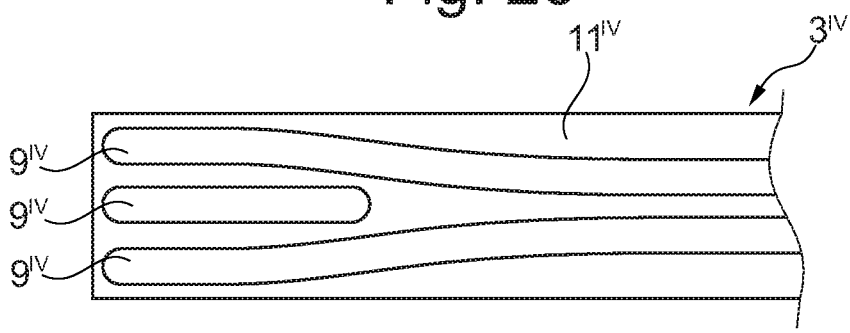
FIG. 2d is a diagram illustrating a detail view according to the section A from FIG. 1 of a fourth alternative embodiment of a lighting device.

As can be seen from FIGS. 2b to 2d, the light guides 9, 9', 9", 9''', $9^{IV}$ can be arranged in different constellations, and can exhibit different shapes and lengths. All these embodiments have it in common that a best possible homogeneity of the light emission is achieved.

Figure 3:
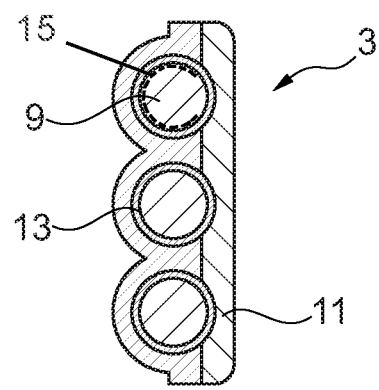
FIG. 3 is a diagram illustrating a schematic cross-section view from the direction B in FIG. 1.

This is achieved by the fact that the lighting device 3 is configured as a closed unit, in that, as can be seen from FIG. 3, the light guide 9 is overmolded by a first material in order to form a housing device 13. In this example, the overmolding takes place in such a way that the light guide 9 is accommodated and form-fitted in the housing device 13. In particular, the light guide 9 is securely connected to the housing device 13, without the possibility of the light guide 9 falling out, or performing a relative movement of the light guide 9 relative to the housing device 13. Next, in a second step, the lens is formed by overmolding. In this example, different materials can be used for the light guide 9, the lens 11, and also for the housing device 13. In particular, the first material of the housing device 13 is impermeable for the light coupled out of the light guide 9 along the longitudinal direction L, while the lens 11 is transparent for this light. In particular, the lens 11 can have different optical properties compared to the light guide 9, in order to achieve a best possible homogeneity of the light emission.

In comparison with integrally formed lenses and light guides, this arrangement allows for a functional separation between the light guide 9 and the lens 11. Therefore, this achieves a greater variability in the optical properties of the lighting device 3.

As can further be seen from FIG. 3, during the overmolding of the light guide 9 with the housing device 13, the area from which it is intended that the light should be coupled out of the light guides 9 and coupled into the lenses 11 is left out. In order to attain a best possible emission of the light guides 9, it is envisaged that a reflective coating 15 is applied on the light guide 9 in the area in which later the housing device is to be moulded around, in order to couple a greatest possible quantity of light into the lens 11.

Figure 4A:
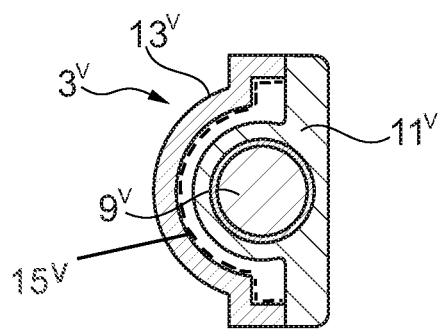
FIG. 4a is a diagram illustrating a schematic cross-section view of a fifth alternative embodiment of a lighting device.
Figure 4B:
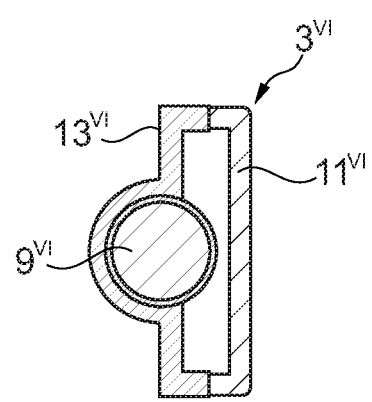
FIG. 4b is a diagram illustrating a schematic cross-section view of a sixth alternative embodiment of a lighting device.

Shown in FIGS. 4a and 4b are alternative embodiments of a lighting device $3^V$, $3^{VI}$. Elements of the lighting devices $3^V$, $3^{VI}$, which correspond to those of the lighting device 3 bear the same reference numbers, but with five or six strokes.

With the lighting device 3V, the entire circumference of the light guide 9V is surrounded by the lens 11V, and thereby achieves a fixing of the light guide 9V relative to the lens 11V. By the subsequent overmolding, the housing device 13V is essentially spray-moulded molded to the lens 11V, wherein. preferably Preferably, a reflective coating 15V is applied onto the side of the housing device 13V which faces towards the lens 11V and the light guide 9V, in order to couple a the greatest possible quantity of light through the lens 11V out of the lighting device 3V.

According to FIG. 4b, it can also be envisaged that the lens $11^{VI}$ is spray-molded in such a way that the lenses $11^{VI}$ are located at a distance from the light guides $9^{VI}$, and the light guide $3^{VI}$ is fixed form-fit by means of the overmolding, by the housing device $13^{VI}$.

The features represented in the foregoing description, in the claims, and in the figures can be essential for the invention in its different embodiments both individually as well as in any desired combination.

REFERENCE NUMBER LIST

1 Rear-viewing device
3, 3', 3", 3''', $3^{IV}$ Lighting device
5 Housing device
7 Recess
9, 9', 9", 9''', $9^{IV}$, $9^V$, $9^{VI}$ Light guide
11, 11', 11", 11''', $11^{IV}$, $11^V$, $11^{VI}$ Lens
13, 13', 13", 13''', $13^{IV}$, $13^V$, $13^{VI}$ Housing device
A Section
B Direction
L, L' Longitudinal direction

What is claimed is:

1. A rear-viewing device of a motor vehicle, comprising a lighting device which comprises at least one housing device, at least one lens, and at least one light guide device arranged at least in some areas between the housing device and the lens,
wherein light produced from at least one light source is configured to be coupled into the light guide device,
the light guide device and the lens are not integrally formed,
the light guide device and at least the lens or at least the lens and the housing are at least in some areas connected to one another by means of overmolding the light guide device, and
at least one of the housing device and the lens, at least in some areas, directly surrounds the light guide device so that the light guide device is connected form-fitting with at least one of the housing device and the lens, and the light guide device and the lens exhibit different optical properties.

2. The rear-viewing device of claim 1, wherein the rear-viewing device comprises at least one of at least one rear-view element, at least one imaging device, and at least one actuator device for moving the rear-view element.

3. The rear-viewing device according to claim 1, wherein the housing device is comprised at least in some areas by the rear-viewing device, the housing device at least in some areas surrounding the rear-view element or is connected to the rear-viewing device, arranged on a side of the housing device facing away from the rear-view element, at least partially accommodated in at least one recess.

4. The rear-viewing device according to claim 1, wherein the light guide device comprises at least one light guide or the light propagating along a longitudinal direction of the light guide device can be emitted at least in some areas in a direction perpendicular to the longitudinal direction and in a direction of the lens.

5. The rear-viewing device according to claim 1, wherein the lens is at least partially transparent to the light emitted from the light source or from the light guide device, or the housing device is at least in some areas non-transparent for light emitted from the light source or the light guide device.

6. The rear-viewing device according to claim 1, wherein the light source comprises at least one of at least one light diode, at least one gas discharge lamp, and at least one incandescent lamp.

7. The rear-viewing device according to claim 1, wherein the lens is formed by overmolding the light guide.

8. The rear-viewing device according to claim 1, wherein the area of the light guide device facing the lens is at least partially left out from being surrounded by the housing device.

9. The rear-viewing device according to claim 8, wherein the lens in some areas directly surrounds the light guide device over its entire circumference completely, and the lens is arranged in some areas at a distance from the housing device.

10. The rear-viewing device according to claim 8, characterized in that the light guide device is arranged at least in some areas at a distance from the lens and in some areas is directly surrounded by the housing device.

11. The rear-viewing device according to claim 1, wherein at least one reflection device is arranged at least in some areas between the light guide device and the housing device, and on a surface of the housing device which faces the light guide device, and by means of the reflection device, the light emitted from at least one of the light source and the light guide device can be reflected at least partially.

12. A method for producing a rear-viewing device, comprising providing at least one light guide device, and forming at least a lens or at least the lens and one housing device by means of overmolding at least part of the light guide device, wherein the light guide device and the lens exhibit different optical properties or comprise different materials, and the light guide device and the lens are not integrally formed.

13. A rear-viewing device of a motor vehicle, comprising:
a lighting device, comprising:
at least one housing device;
at least one lens; and
at least one light guide device arranged between the housing device and the lens, wherein light produced from at least one light source is configured to be coupled into the light guide device, the light guide device and at least one of the at least one housing device and the at least one lens are connected to one another by means of overmolding the light guide device, at least one of the at least one housing device and the at least one lens directly surrounds the light guide device, at least in some areas, so that the light guide device is connected form-fitting the lens, the area of the light guide device facing the lens is at least partially left out from being surrounded by the housing device, the lens in some areas directly surrounds the light guide device over its entire circumference completely, and the lens is arranged in some areas at a distance from the housing device, and the light guide device and the lens exhibit different optical properties.

* * * * *